US010223226B2

United States Patent
Behrend et al.

(10) Patent No.: US 10,223,226 B2
(45) Date of Patent: *Mar. 5, 2019

(54) CONTROLLING AN ELECTRONIC CIRCUIT

(71) Applicant: International Business Machines Corporation, Armonk, NY (US)

(72) Inventors: Joerg Behrend, Rangendingen (DE); Holger Horbach, Aidlingen (DE); Alexander Jung, Leinfelden-Echterdingen (DE); Klaus Keuerleber, Stuttgart (DE); Sandeep Korrapati, Bangalore (IN); Juergen Wakunda, Ilsfeld (DE)

(73) Assignee: International Business Machines Corporation, Armonk, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/351,416

(22) Filed: Nov. 14, 2016

(65) Prior Publication Data
US 2018/0137023 A1 May 17, 2018

(51) Int. Cl.
*G06F 11/00* (2006.01)
*G06F 11/263* (2006.01)

(52) U.S. Cl.
CPC .................. *G06F 11/263* (2013.01)

(58) Field of Classification Search
USPC ........................................................ 714/30
See application file for complete search history.

(56) References Cited

U.S. PATENT DOCUMENTS 7,228,453 B2 * 6/2007 O'Brien .............. G06F 11/2097
709/220
7,302,656 B2 11/2007 Weber et al.
(Continued)

FOREIGN PATENT DOCUMENTS

WO WO2010001322 A1 1/2010

OTHER PUBLICATIONS

Bommu et al.; "Resource-constrained Compaction of Sequential Circuit Test Sets"; VLSI Design, 2000. Thirteenth International Conference on Date of Conference: 2000.
(Continued)

*Primary Examiner* — Sarai E Butler
(74) *Attorney, Agent, or Firm* — David B. Woycechowsky

(57) ABSTRACT

Disclosed aspects relate to controlling an electronic circuit having multiple units with at least one signal input each. A set of signal resources is determined by tracing back a dependency tree for each unit signal input until an endpoint representing a signal resource is reached. For each signal resource in the set a resource manager may be provided in dependence of its signal type. That resource manager may be assigned a set of signal inputs comprising each signal input in the circuit which was traced back to its respective signal resource. The resource manager is configured for controlling the signal resource. A control device may be provided to receive technical implementation requirements for one or more of the resource managers, detect conflicting requirements received for the one or more resource managers, and enable or disable one or more of the resource managers in response to the detected conflicting requirements.

19 Claims, 4 Drawing Sheets

(56) References Cited

U.S. PATENT DOCUMENTS

| | | | |
|---|---|---|---|
| 7,559,060 B2 * | 7/2009 | Schmidt | G06F 9/4887 |
| | | | 714/2 |
| 8,214,803 B2 | 7/2012 | Horii et al. | |
| 8,739,131 B2 | 5/2014 | Gyure et al. | |
| 2009/0144592 A1 | 6/2009 | Chakraborty et al. | |
| 2010/0064180 A1 * | 3/2010 | Farkas | H05K 1/0251 |
| | | | 714/45 |
| 2012/0054511 A1 | 3/2012 | Brinks et al. | |
| 2012/0144392 A1 | 6/2012 | Freitas et al. | |
| 2013/0073878 A1 * | 3/2013 | Jayasimha | G06F 1/3287 |
| | | | 713/300 |
| 2015/0067636 A1 | 3/2015 | Bassin et al. | |
| 2016/0048155 A1 * | 2/2016 | Gupta | G06F 1/12 |
| | | | 327/142 |
| 2017/0038997 A1 * | 2/2017 | Haque | G06F 3/0644 |

OTHER PUBLICATIONS

Behrend et al., "Controlling an Electronic Circuit", U.S. Appl. No. 15/897,214, filed Feb. 15, 2018, 23 pages.
Appendix P—List of IBM Patents or Patent Applications Treated as Related, Filed herewith, 2 Pages.

* cited by examiner

CONTROLLING AN ELECTRONIC CIRCUIT

BACKGROUND

This disclosure relates generally to computer systems and, more particularly, relates to controlling the function of an electronic circuit.

One of the most prominent features of the Pervasive Infrastructure Logic is to control and provide vital resources: Power, Clocks and Resets to the chip. These resources are arranged in individual domains and distributed over the chip. However, there are interdependencies between different resources. To verify the full legal state space of the Pervasive Logic these resources need to be considered during generation of any test case. This results in test cases with different requirements on the state of the resources to complete successfully.

SUMMARY

Aspects of the disclosure relate to controlling an electronic circuit having multiple units with at least one signal input each. A set of signal resources is determined by tracing back a dependency tree for each unit signal input until an endpoint representing a signal resource is reached. For each signal resource in the set a resource manager may be provided in dependence of its signal type. That resource manager may be assigned a set of signal inputs comprising each signal input in the circuit which was traced back to its respective signal resource. The resource manager is configured for controlling the signal resource. A control device may be provided to receive technical implementation requirements for one or more of the resource managers, detect conflicting requirements received for the one or more resource managers, and enable or disable one or more of the resource managers in response to the detected conflicting requirements.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
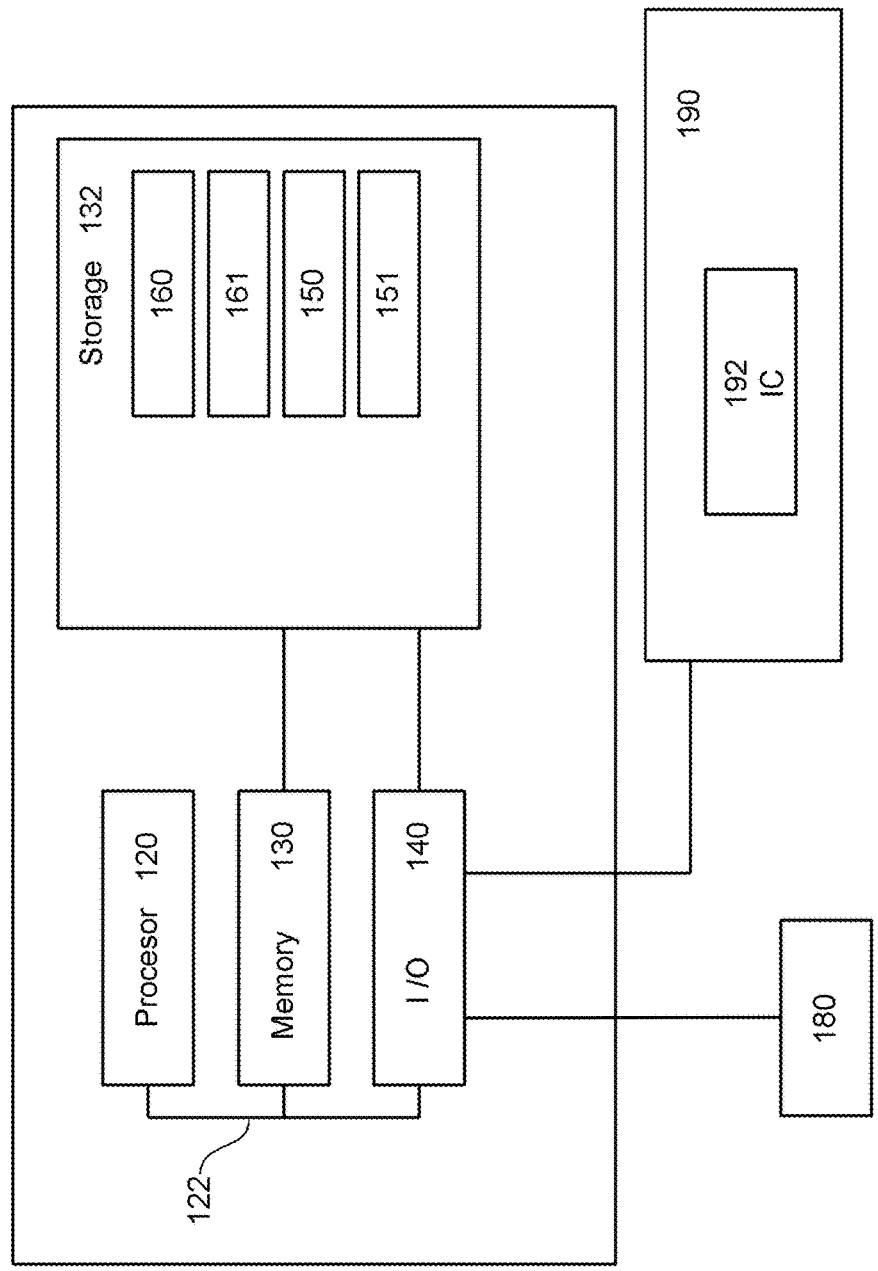
FIG. 1 is a block diagram for a system for verifying an electronic circuit, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In contrast to functional verification, which verifies the function of a logic design, the goal of pervasive verification is to get the design into a functional state. For this, several prerequisites may be required, e.g. power must be on, clocks must be running and the logic must have been reset. Only then the logic can be initialized by setting register bits. So every initialization action has a set of resource requirements (in terms of power/clock/reset) that need to be fulfilled before. Usually there are multiple power/clock/reset domains in a system and initialization actions often have cross-domain dependencies. In one example, the present disclosure describes a method to model the resource requirements of each initialization action using a resource manager for each resource in a dependency tree. Instead of setting up a specific resource scenario and then run whatever initialization actions are possible for that setup, the method provides a mechanism to dynamically choose one or more initialization actions and the resource managers take care of the prerequisites (i.e. resources required).

As designs become very sophisticated and their domains are inter-dependence of each other, the present method may provide an effective and efficient way for controlling their function. This may particularly be advantageous for inter-domain logic between different types of domains (heterogeneous domains). The present method may take into account the dependency between the heterogeneous domains as well as conflicting resource requirements of different circuit tests for verifying the electronic circuit under those tests in an optimal way.

According to one embodiment, the method further comprises: for each resource manager of the generated resource managers determining its dependencies from other resource managers regarding the respective sets of input signals, wherein the control device is generated in dependence of the determined resource manager dependencies. This embodiment may further improve the control efficiency of the electronic circuit by enabling or disabling the resource managers based on their dependency.

The dependency between two resource managers may for example be an inherent dependency e.g. a clock resource manager may depend on the power resource manager as the clock needs power. The dependency may further include a dependency defined by received resource requirements. For example resource requirements may indicate that the power resource manager of domain 1 may depend on power resource manager of domain 2 etc.

The dependencies may for example be solved or managed using the promise theory in order to centrally arrange for a consistent policy among the resource managers. For example, a promise may be a labelled edge<n1, D, n2> in a graph whose nodes ni are resource managers. The graph may for example be part of the control device. The graph may for example be built by the control device upon receiving requirements and/or dependencies from tests and/or from resource managers. A promise may be denoted by n1→(D) n2 which is interpreted as "n1 asserts its compliance with a policy constraint D to n2". For example, a resource manager X promises "D" to resource manager Y e.g. to provide service type "power signal in time t".

According to one embodiment, the received requirements comprise first requirements of a first test of the electronic circuit and second requirements of a second test of the electronic circuit. The method further comprises executing the first and second tests under the condition of anyone of an enabling or disabling of the one or more resource managers.

According to one embodiment, the executing of the first and second tests being performed in parallel or concurrently or in sequence. These embodiments may have the advantage of controlling the function of the electronic circuit using multiple tests. For example, parallel tests may be used to reduce the verification time of the electronic circuit.

According to one embodiment, the first and second tests being parallel tests, wherein the enabling and disabling of the one or more resource managers further comprises pausing the execution of one of the first and second tests while executing the other test, and continuing execution of the one of the first and second tests after solving the conflict. This may speed up the verification process of the electronic circuit as it may a further test as soon as the conflict with another test is solved and may for example avoid running them in sequence.

According to one embodiment, detecting the conflict comprising: receiving by at least one resource manager of the generated resource managers a first and second resource requirement via first and second tests respectively, determining by the resource manager that the first and second requirements are conflicting requirements and sending a message indicating the conflict to the conflict detector.

According to one embodiment, the electronic circuit is partitioned into at least one power domain partition, at least one clock domain partition, and at least one reset domain partition, wherein each resource manager of the resource managers is generated for a respective one of the clock, power and reset domains. This may enable an inter-domain analysis across different domain types.

According to one embodiment, the dependencies are determined in accordance with a promise theory using each dependency as a promise. This may increase the accuracy of the control of the electronic circuit.

According to one embodiment, the determining of the set of signal resources comprises parsing a textual description of the structure and behavior of the electronic circuit.

According to one embodiment, the textual description is a HDL description. These embodiments may have the advantage of seamlessly integrating the present method in design test systems by for example using HDL descriptions.

FIG. 1 is a block diagram for a system for verifying an electronic circuit. System 100 includes computer 110 and prototyping circuit card 190.

Prototyping circuit card 190 includes and electronic circuit or integrated circuit 192 (e.g. chip). Electronic circuit 192 may for example be a Programmable logic device (PLD). In another example, electronic circuit 192 may comprise an FPGA. Prototyping circuit card 190 may include circuitry to receive configuration information for electronic circuit 192 from computer 110, to initiate the configuration, reconfiguration, or reset of electronic circuit 192 in response to computer 110, and to communicate test data between electronic circuit 192 and a connection to computer 110.

Computer 110 is a data processing apparatus adapted to perform electronic design automation (EDA) functions including, for example, circuit diagnostic testing. Computer 110 includes processor circuitry (or processor) 120, memory 130, I/O circuitry 140, coupled together by bus 122.

Processor circuitry 120 includes circuitry to effect EDA data processing functions. Processor circuitry 120 may include one or more microprocessor cores in one or more IC packages. In another example, processor circuitry 120 may include one or more PLD devices configured to effect EDA data processing functions. PLD devices may include, for example, gate arrays, CPLDs, FPGAs, or mask-program structured logic devices.

The memory 130 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 130 can have a distributed architecture, where various components are situated remote from one another, but can be accessed by the processor circuitry 120.

Memory 130 in combination with persistent storage device 132 may be used for local data and instruction storage. Storage 132 includes one or more persistent storage devices and media controlled by I/O circuitry 140. Storage 132 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Storage 132 includes software portions 150-151 and data portions 160-161. User application 150 includes program instructions for processing user input related to testing and diagnostics and to interact with an implemented DUT. In one example user application 150 further includes program instructions to implement a DUT instance by either starting a simulation of a user design or by configuring a PLD for it. Other EDA software 151 includes program instructions for performing other EDA functions on computer 110.

Data portion 160 comprises design data for the electronic circuit 192 and may include information representing a user circuit design. For example data portion 160 may comprise description of the design of the electronic circuit that may be described (e.g. in one or more design files) using a hardware description language (HDL). Data portion 161 may comprise diagnostic or test data which may include information useful in conducting diagnostic testing on an implemented user design. Data portion 161 may include, for example, test data patterns used to establish signaling or operating states or conditions for a DUT. Data portion 161 may include, for example, programming or scripting statements related to conducting a diagnostic testing procedure or process.

One of skill in the art understands that while stored software 150-151 and data 160-161 are shown in persistent storage 132, such software and data, in whole or in part, could be stored in memory 130 as an alternative to, or in addition to, its storage at 132.

System 100 further includes user interface apparatus 180 in form of one or more devices to facilitate user interaction with computer 110. Examples of user interface input devices include keyboards, keypads, mice, touch sensitive surfaces, and digitizing tablets. Samples of user interface output devices include graphical display screens, text panels, and printers.

Figure 2:
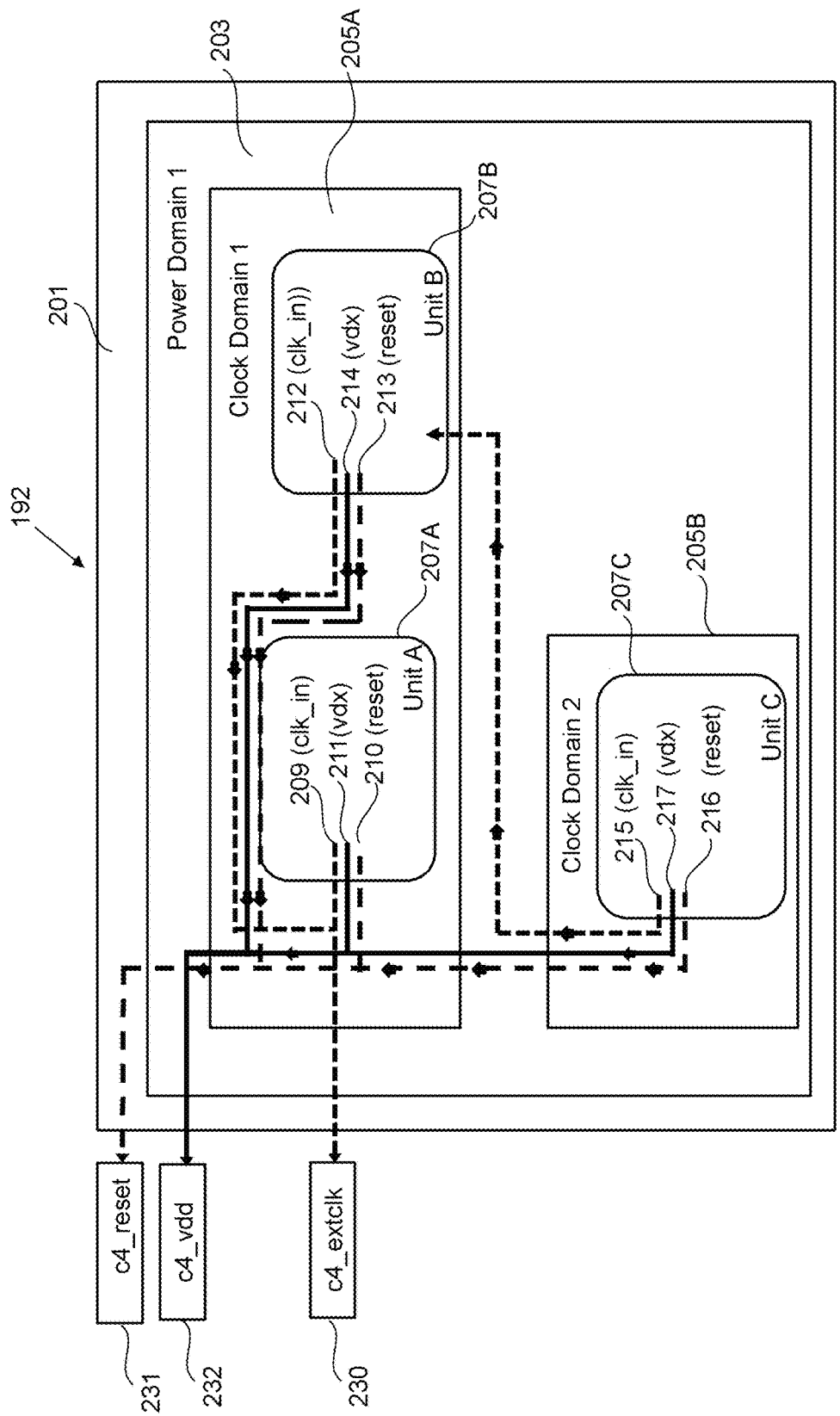
FIG. 2 is a block diagram for an electronic circuit, according to embodiments.

FIG. 2 is a block diagram for an electronic circuit such as electronic circuit 192. FIG. 2 illustrates, for exemplification purpose, power, clock and reset domains as being hierarchical so that a functional mode for a given domain implies a specification of a given functional mode (e.g. distinct power levels) of other domains.

For example, electronic circuit 192 is shown as comprising a reset domain 201, power domain 203 and clock domains 205A-B. A clock domain as used herein is a block e.g. 205A of circuitry that operates at a single clock frequency (e.g. having one clock signal source) that may differ from the frequency of other blocks e.g. 205B on the same electronic circuit. A power domain is a collection of design blocks or instances that share the same supply voltage. A reset domain is a block of circuitry that operates at a reset signal (e.g. having a one reset signal source).

Power domain 203 comprises design blocks or units 207A-C. Clock domain 205A comprises design blocks or units 207A-B and clock domain 205B comprises design block 207C. Reset domain 201 comprises design blocks or units 207A-C. A unit may for example be an electronic component such as a fixed point unit, cache etc.

Each of the design blocks or units 207A-C is shown as comprising input pins for clock signal, power and reset signal respectively. An input pin is a pin through which a signal enters a design block or unit 207A-C.

For example, unit 207A comprises an input pin 209 through which a clock signal received from clock 230 can be entered to unit 207A. Unit 207A further comprises an input pin 210 through which a reset signal received from reset signal resource 231 can be entered to unit 207A. Unit 207A comprises an input pin 211 through which unit 207A can be powered using power source 232.

Unit 207B comprises an input pin 212 through which a clock signal received from clock 230 can be entered to unit 207B. Unit 207B further comprises an input pin 213 through which a reset signal received from reset signal resource 231 can be entered to unit 207A. Unit 207 B comprises an input pin 214 through which unit 207B can be powered using power source 232.

Unit 207C comprises an input pin 215 through which a clock signal received from unit 207B can be entered to unit 207C. Unit 207C further comprises an input pin 216 through which a reset signal received from reset signal resource 231 can be entered to unit 207A. Unit 207C comprises an input pin 217 through which unit 207C can be powered using power source 232.

There are interdependencies between different resources or domains. For example, clock domains 205A and 205B require power domain 203 to be active before they can be activated. Clock domain 205B requires clock domain 205A to be active.

Figure 3:
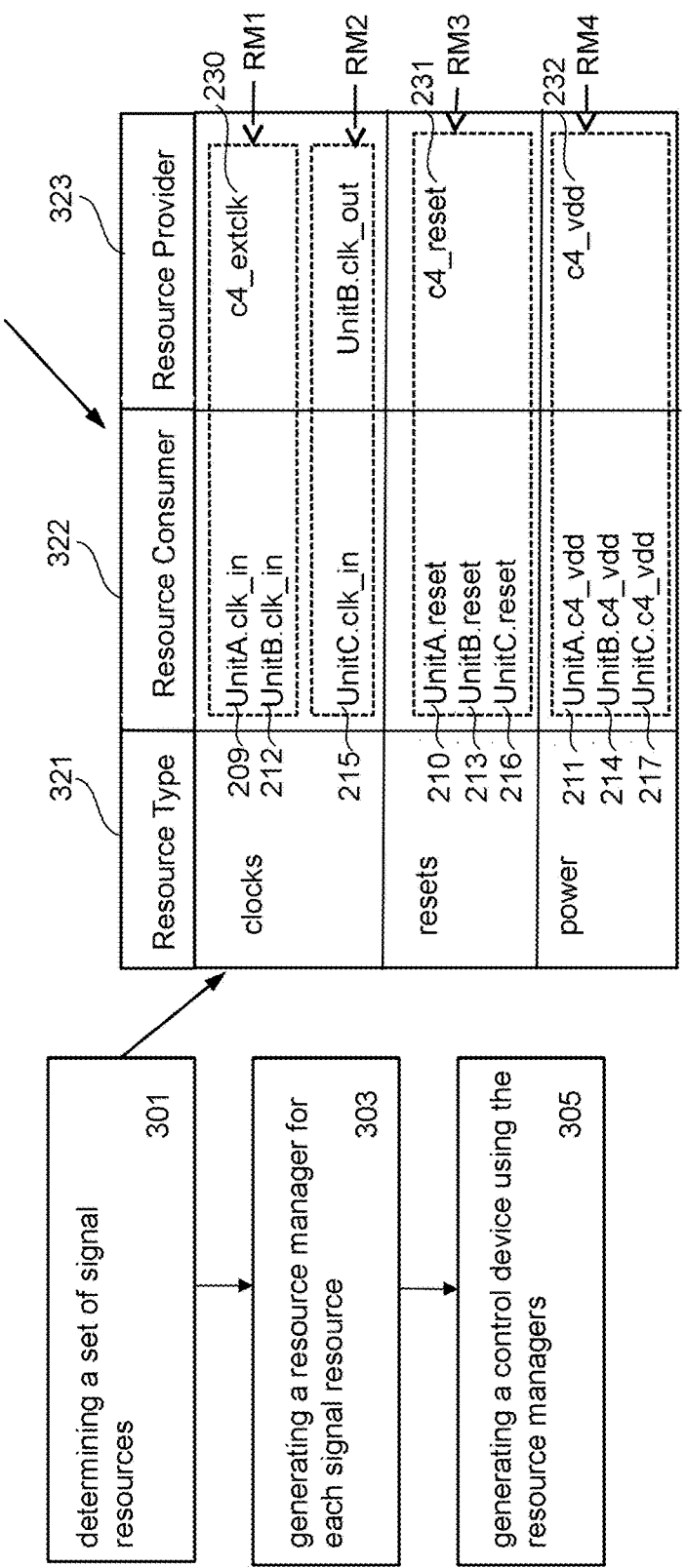
FIG. 3 is a flowchart of a method for controlling the function of the electronic circuit, according to embodiments.

FIG. 3 is a flowchart of a method for controlling the function of the electronic circuit 192. For example, the method of FIG. 3 may be used for pervasive verification of the electronic circuit 192. For example, the method of FIG. 3 may automatically be performed e.g. on a predefined periodic basis.

In step 301, a set of signal resources may be determined by tracing back a dependency tree for each unit signal input or input pin until an endpoint or signal resource or resource provider is reached. For example, step 301 may be performed for each unit 207A-C of electronic circuit 192.

The dependency tree may for example be provided in the form of a textual description of the structure and behavior of the electronic circuit 192 comprise in one or more design files 160. The textual description may comprise a HDL description. The dependency tree may for example indicate the resource providers input pins and nature of dependencies as illustrated in FIG. 2 by links between input pins and resource providers. Step 301 may be performed by parsing the one or more design files 160.

For unit 207A, the dependency tree may be traced back for each input pin 209-211 until a respective endpoint is reached namely the clock, reset and power signal resources 230-232 respectively. For unit 207B, the dependency tree may be traced back for each input pin 212-214 until a respective endpoint is reached namely the clock, reset and power signal resources 230-232 respectively. For unit 207C, the dependency tree may be traced back for each input pin 215-216 until a respective endpoint is reached namely the output clock pin of unit 207B, reset and power signal resources 231-232 respectively. The input pin 215 is traced back to the output clock pin of the unit 207B.

The result of the mapping of step 301 is summarized in table 320. Column 321 indicates the type resources being provided by the identified endpoints or signal resources. The resource type may comprise clock, resets and power resource types. For each resource type of column 321 a set of input pins and associated resource providers are indicated in columns 322 and 323 respectively.

For example, since input pins 209, 212 and 215 are used for clock signal inputs they are listed as part of column 322 and being associated with the resource type "clock". Furthermore, the resource provider 230 and output clock pin of unit 207B that are identified when parsing back the dependency tree of input pins 209, 212 and 215 respectively are listed in column 323 in association with resource type "clock".

For example, since input pins 210, 213 and 216 are used for reset signal inputs they are listed as part of column 322 and being associated with the resource type "resets". Furthermore, the resource providers for reset signals that are identified when parsing back the dependency tree of input pins 210, 213 and 216 may are listed in column 323 in association with resource type "resets".

And, since input pins 211, 214 and 217 are used for power signal inputs they are listed as part of column 322 and being associated with the resource type "power". Furthermore, the resource providers 232 for power signals that are identified when parsing back the dependency tree of input pins 211, 214 and 217 may are listed in column 323 in association with resource type "power".

In step 303, for each signal resource, 230-232 and output clock pin of the unit 207B, in said set of signal resources, a resource manager RM1-4 may be generated in dependence of its signal type e.g. "clocks", "resets" or "power" as indicated in table 320 and a set of signal inputs may be assigned comprising each signal in the electronic circuit 192 which depends on the signal resource. The resource manager RM1-RM4 is configured for controlling the corresponding signal resource.

For example, resource manager RM1 may be configured to control the signal resource or resource provider 230 (clock). Resource manager RM2 may be configured to control the signal resource or resource provider which is output clock pin of the unit (UnitB.clk_out) 207B. Resource manager RM3 may be configured to control the signal resource or resource provider 231 (reset signal resource).

Resource manager RM4 may be configured to control the signal resource or resource provider 232 (power source).

In one example, a resource manager of the resource managers RM1-RM4 may be generated, using a software template, for controlling the operation of a resource provider, wherein the template is adapted to each resource manager by using the identified resource provider and resource consumers or input pins that are associated with the resource manager. For example, each resource type may be associated with a respective software template or all resource types may be associated with a single software template.

In another example, each resource manager RM1-4 may be an instance of a reference resource manager (e.g. the reference resource manager may be in the form of a generic code that can be flavored or adapted for each resource manager). An instance e.g. of RM1 may be obtained by instantiating the reference resource manager using the resource consumers 322 and providers 321 of the resource manager RM1.

In step 305, a control device (in hardware and/or software) for controlling the function of the electronic circuit 192 may be provided or generated. The control device may be generated so as to comprise receiving means to receive requirements for resource managers RM1-RM4. For example, for running one or more tests on the electronic circuit the tests may have some requirements on resources provided by the resource providers 230-232. In other words, the tests may have requirements for the resource managers that manage (e.g. switch on/off) the resource providers 230-232. The receiving means may be configured to receive those requirements of the tests e.g. before the tests are performed.

These requirements may for example indicate for a given test that the clock must be switched off when testing the unit 207A. However, another test may require that the clock must be switched on when testing unit 207B. This may create a conflict in particular if the two tests run in parallel or in concurrence.

For that, the generated control device comprises a conflict detection means to detect conflicting requirements in response to said receiving means. For example, upon receiving the requirements at the receiver means, the conflict detection means may receive from the receiving means the requirements so as to check or detect conflicting requirements.

Based on said detected conflicting requirements enabling means of the control device may be configured to enable or disable resource managers in response to said conflict detection means. For example, enabling a resource manager may comprise configuring the resource manager to switch on the associated resource provider.

The enabling or disabling of the resource managers may further take into account their dependency. For example, for each resource manager of the generated resource managers RM1-RM4 its dependencies from other resource managers in dependence of the respective sets of signal inputs may be determined. For example, RM2 depends on RM1 because the clock signal source of unit 207C is managed or provided by the output clock pin of unit 207B.

Figure 4:
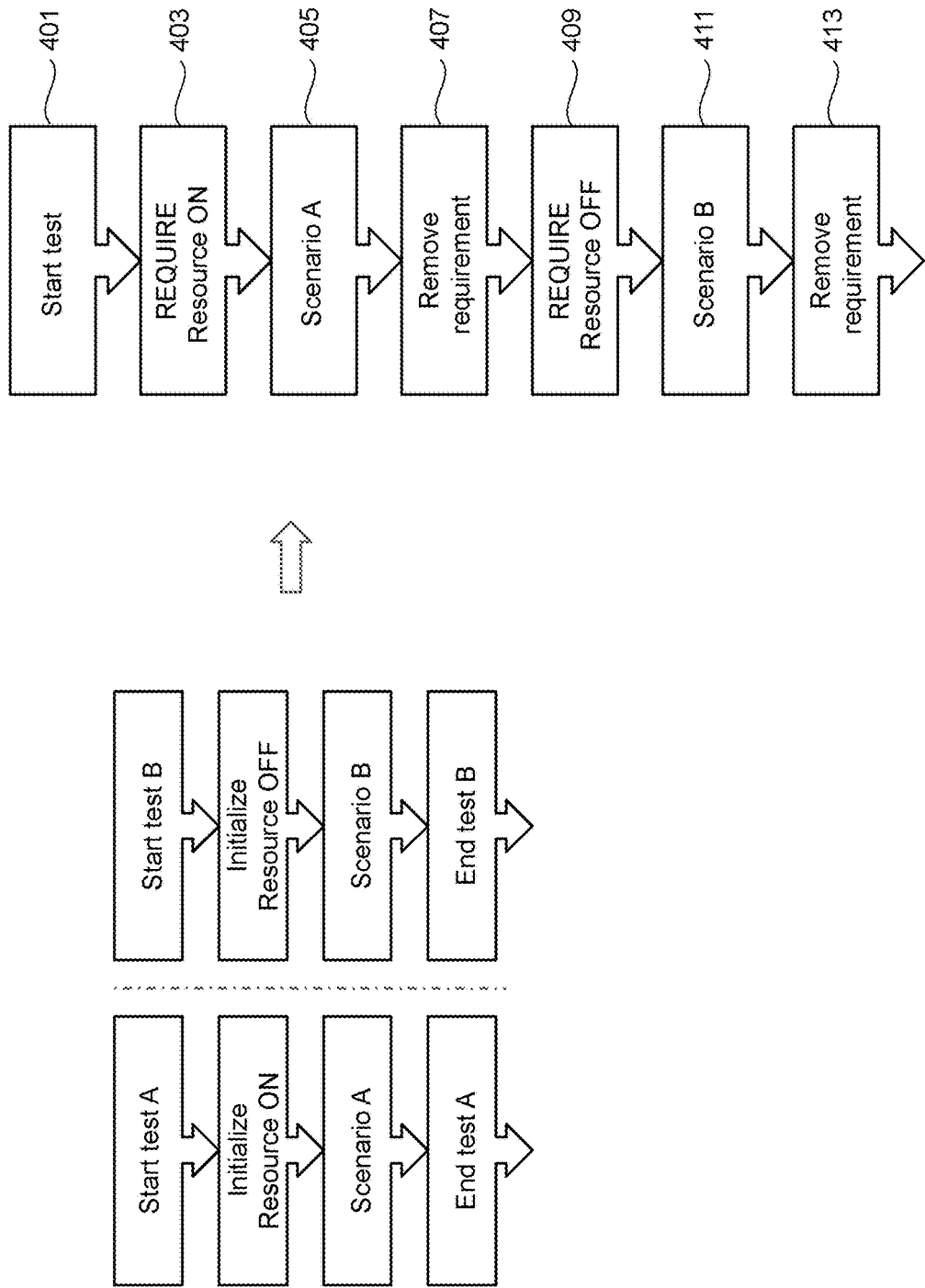
FIG. 4 illustrates an example of a method for processing two tests on the electronic circuit, according to embodiments.

FIG. 4 illustrates an example of a method for processing two tests A and B on the electronic circuit 192. The test A is configured for testing the unit 207A using a given test scenario A, while test B is configured for testing the unit 207B using a given test scenario B.

Test A requires that the clock signaling is enabled for testing the unit 207A, while test B requires that the clock signaling is disabled.

The two tests A and B are intended to run in parallel as illustrated in FIG. 4, left side.

Before being performed, the requirements of the two tests may be received at the receiving means. The requirements indicate that the test A requires that clock signaling is enabled and that test B requires that clock signaling is disabled. The conflict detection means may thus detect that there is a conflict between the two requirements because one test requiring the clock to be "on" while the other test requires that the clock be "off". Based on these detected conflict, the enabling means may determine which resource provider is concerned with the conflict and which are the associated resource managers. In this case it may determine e.g. using table 320, the resource provider 230 and associated resource manager RM1. The enabling means may then enable or disable RM1 for performing the two tests A and B.

For that, tests A and B are first initiated in step 401. In step 403, the resource manager RM1 is enabled such that the test scenario A is executed in step 405. Upon executing test scenario A or upon determining that test scenario A is not requiring anymore the clock to be "on" (e.g. the clock may only be required at an intermediate stage of the test scenario A) the requirements of test A may be removed in step 407, such that only requirements of test B are left. In step 409, the resource manager RM1 is disabled such that the test scenario B is executed in step 411. Upon executing test scenario B the requirements of test B may be removed in step 413. In this way the two tests A and B have been executed taking into account their requirements conflict.

In one example, the dependencies between the resource managers may be resolved or managed using the promise theory such that each resource manager may provide its dependencies and/or requirements from other resource managers in the form of a promise.

In another example, a method to verify the functional correctness of a design of an electronic circuit is provided. Said design comprises multiple units with at least one input signal each. The method comprises: determining a set of resource signals by tracing back the dependency tree for each unit input signal until an endpoint is reached; for each resource signal in said set generating a resource manager in dependence of its signal type and assigning a set of resource consumers comprising each signal in said design which depends on the resource signal; for each resource manager determining its dependencies from other resource managers in dependence of the respective sets of resource consumers; generating a control device in dependence of the determined resource manager dependencies, said resource manager comprising receiving means to receive requirements for resource managers; conflict detection means to detect conflicting requirements in response to said receiving means; enabling means to enable or disable resource managers in response to said conflict detection means.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the disclosure may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for controlling the function of an electronic circuit comprising multiple units with at least one signal input each, the method comprising:
   determining a set of signal resources by tracing back a dependency tree for each unit signal input until an endpoint representing a signal resource is reached;
   for each signal resource in the set providing a resource manager in dependence of its signal type and assigning to the resource manager a set of signal inputs comprising each signal input in the circuit which was traced back to its respective signal resource, the resource manager being configured for controlling the signal resource; and
   providing a control device comprising:
      a receiver to receive technical implementation requirements for one or more of the resource managers;
      a conflict detector to detect conflicting requirements received for the one or more resource managers; and
      an enabler to enable or disable one or more of the resource managers in response to the detected conflicting requirements.

2. The method of claim 1, further comprising:
   for each resource manager of the generated resource managers determining its dependencies from other resource managers regarding the respective sets of input signals, wherein the control device is generated in dependence of the determined resource manager dependencies.

3. The method of claim 1, wherein the received requirements comprise first requirements of a first test of the electronic circuit and second requirements of a second test of the electronic circuit, the method further comprising executing the first and second tests under the condition of anyone of an enabling or disabling of the one or more resource managers.

4. The method of claim 1, wherein the received requirements comprise first requirements of a first test of the electronic circuit and second requirements of a second test of the electronic circuit, the method further comprising executing the first and second tests under the condition of an enabling of the one or more resource managers, the executing of the first and second tests being performed in parallel.

5. The method of claim 1, wherein the received requirements comprise first requirements of a first test of the electronic circuit and second requirements of a second test of the electronic circuit, the method further comprising executing the first and second tests under the condition of an enabling of the one or more resource managers, the executing of the first and second tests being performed in a concurrent fashion.

6. The method of claim 1, wherein the received requirements comprise first requirements of a first test of the electronic circuit and second requirements of a second test of the electronic circuit, the method further comprising executing the first and second tests under the condition of an enabling of the one or more resource managers, the executing of the first and second tests being performed in sequence.

7. The method of claim 1, wherein the received requirements comprise first requirements of a first test of the electronic circuit and second requirements of a second test of the electronic circuit, the method further comprising executing the first and second tests under the condition of a disabling of the one or more resource managers, the executing of the first and second tests being performed in parallel.

8. The method of claim 1, wherein the received requirements comprise first requirements of a first test of the electronic circuit and second requirements of a second test of the electronic circuit, the method further comprising executing the first and second tests under the condition of a disabling of the one or more resource managers, the executing of the first and second tests being performed in a concurrent fashion.

9. The method of claim 1, wherein the received requirements comprise first requirements of a first test of the electronic circuit and second requirements of a second test of the electronic circuit, the method further comprising executing the first and second tests under the condition of a disabling of the one or more resource managers, the executing of the first and second tests being performed in sequence.

10. The method of claim 3, the first and second tests being parallel tests, wherein the enabling and disabling of the one or more resource managers further comprises pausing the execution of one of the first and second tests while executing the other test, and continuing execution of the one of the first and second tests after solving the conflict.

11. The method of claim 1, detecting the conflict comprising: receiving by at least one resource manager of the generated resource managers a first and second resource requirement via first and second tests respectively, determining by the resource manager that the first and second requirements are conflicting requirements and sending a message indicating the conflict to the conflict detector.

12. The method of claim 1, wherein the electronic circuit is partitioned into at least one power domain partition, at least one clock domain partition, and at least one reset domain partition, wherein each resource manager of the resource managers is generated for a respective one of the clock, power and reset domains.

13. The method of claim 1, wherein the electronic circuit is partitioned into at least one power domain partition, wherein each resource manager of the resource managers is generated for one of the power domains.

14. The method of claim 1, wherein the electronic circuit is partitioned into at least one clock domain partition, wherein each resource manager of the resource managers is generated for one of the clock domains.

15. The method of claim 1, wherein the electronic circuit is partitioned into at least one reset domain partition, wherein each resource manager of the resource managers is generated for one of the reset domains.

16. The method of claim 2, wherein the dependencies are determined in accordance with a promise theory using each dependency as a promise.

17. The method of claim 1, the determining of the set of signal resources comprising parsing a textual description of the structure and behavior of the electronic circuit.

18. The method of claim 17, the textual description being a HDL description.

19. A computer program product for controlling the function of an electronic circuit, the computer program product comprising a computer readable storage medium having program instructions embodied therewith, wherein the computer readable storage medium is not a transitory signal per se, the program instructions executable by a processor to cause the processor to perform a method comprising:
  determining a set of signal resources by tracing back a dependency tree for each unit signal input until an endpoint representing a signal resource is reached;
  for each signal resource in the set providing a resource manager in dependence of its signal type and assigning to the resource manager a set of signal inputs comprising each signal input in the circuit which was traced back to its respective signal resource, the resource manager being configured for controlling the signal resource; and
  providing a control device comprising:
    a receiver to receive technical implementation requirements for one or more of the resource managers;
    a conflict detector to detect conflicting requirements received for the one or more resource managers; and
    an enabler to enable or disable one or more of the resource managers in response to the detected conflicting requirements.

* * * * *